Jan. 16, 1968  W. T. RENTSCHLER  3,363,529
PHOTOGRAPHIC CAMERA WITH CHANNEL-CORRELATED SCALE
Filed April 15, 1965

INVENTOR.
Waldemar T. Rentschler
BY
Arthur A. March
ATTORNEY

United States Patent Office 3,363,529
Patented Jan. 16, 1968

3,363,529
PHOTOGRAPHIC CAMERA WITH CHANNEL-CORRELATED SCALE
Waldemar T. Rentschler, Calmbach (Enz), Germany, assignor to Prontor-Werk Alfred Gauthier, G.m.b.H., Calmbach (Enz), Germany
Filed Apr. 15, 1965, Ser. No. 448,463
Claims priority, application Germany, Apr. 18, 1964, G 40,390
4 Claims. (Cl. 95—64)

ABSTRACT OF THE DISCLOSURE

A photographic camera that has controls for setting the distance and diaphragm values wherein the distance setting control is provided with a fixed mark which acts in conjunction with a fixed, progressively graduated, non-linear distance scale. In addition, the camera ras a diaphragm setting control and a linear setting scale associated with the diaphragm control. A guide line scale is associated with the distance scale to correlate the settings of the distance scales to the settings of the linear settings scale. A carrier is temporarily coupled to the diaphragm setting control by spring action and has a resetting indicator which acts in conjunction with the guide line scale.

---

Figure 1:
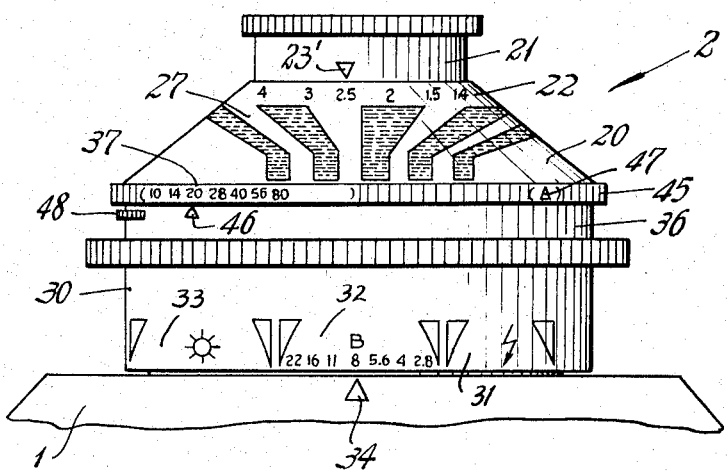

The present invention relates to a photographic camera having controls for setting the distance and diaphragm values wherein the distance setting control is provided with an indicator mark and acts in conjunction with a fixed distance scale comprising a progressively graduated non-linear scale and a linear setting scale which is associated with the diaphragm setting control.

Copending United States application Ser. No. 391,901 filed Aug. 25, 1964, assigned to the same assignee, is directed to a camera provided with a guide line scale having a plurality of guide lines designed to adapt the progressively graduated non-linear distance scale to an interpolating or linear scale which is associated with the diaphragm setting control. In addition, there is also provided a resetting indicator associated with the diaphragm setting control which can be set at the same guide line to which the indicator mark on the distance setting control is set when flash exposures are to be taken so that a proper pairing of distance and diaphragm values according to the set guide number is achieved. Thus, the apparatus in the aforementioned copending application makes possible the adaptation of the different scale characteristics of distance and diaphragm to each other as well as providing for the setting of distance and diaphragm values which are properly paired according to the set guide number when effecting flash exposures. This results in a simplification of the operation of the camera and is achieved without any requirement for additional space for installation of those components which effect such simplified operation.

The present invention is a further improvement upon the camera described in the aforementioned copending application and serves to extend the range of application of the teachings set forth in this copending application. The operation of a camera according to the present invention is maintained at a relatively simple and easy level without any significant complexity added to the functioning of the various components.

The foregoing results are achieved according to the present invention by providing that the resetting indicator which acts in conjunction with the guide line scale be arranged on a carrier which is tensionally connectible to the diaphragm setting control. Such an arrangement permits the use of guide lines on cameras having diaphragm setting controls which can be switched between several operating ranges.. The diaphragm setting control may be of the type which comprises, in addition to the operating range used for setting the diaphragm in the flash range, a first additional operating range provided for setting the diaphragm when B-exposures are to be effected and a second additional operating range within which the diaphragm may be set in response to particular light conditions. The tensional connection of the resetting indicator with the diaphragm setting control is made such that the movement of the indicator remains limited to the sweep of the diaphragm scale. The advantage of this is that irritations during the exposure setting of the camera are largely avoided since the resetting indicator is moved solely during exposure settings within the flash range. Because the movement of the resetting indicator remains limited to the sweep of the diaphragm scale, the elements which releasably connect the carrier to the diaphragm setting control require a comparatively short path of movement which does not adversely affect the flexibility and freedom of choice of the arrangement and construction of the individual structural elements within the shutter.

Another feature of the invention resides in the fact that the carrier on which the resetting indicator is arranged can be coupled to a setting control which serves to take into consideration different guide number values and which can be connected to the diaphragm setting control by a unilaterally acting driving connection. This feature insures a simple mode of operation at all times even in those cameras which comprise a guide number setting control in addition to the diaphragm setting control that can be switched to several operating ranges.

With respect to the tensional coupling between the diaphragm setting control and the carrier on which the resetting indicator is arranged so as to set the proper guide number, the invention further provides that the diaphragm setting control and the carrier of the reset indicator or the guide number setting control, respectively, are each provided with a driver, and that a resetting spring acts on the carrier, or the guide number setting control, respectively. The spring keeps the carrier in contact with the diaphragm setting control within one operating range of the camera. A stop member is positioned in the range of movement of the carrier which limits the movement of the carrier in one direction of movement. The entire arrangement is composed of comparatively inexpensive members. The tensional coupling may be of sturdy construction due to the simplicity of the individual structural elements and, therefore, the tensional coupling may have a practically unlimited useful life.

Figure 2:
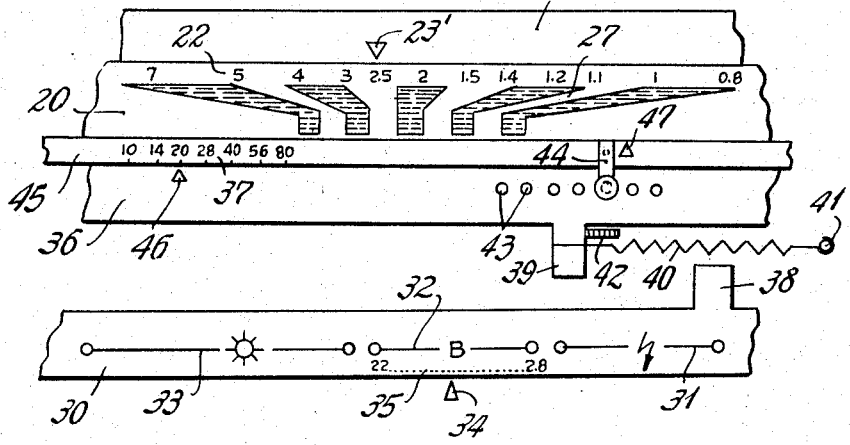

An embodiment of the invention will be described below by way of the accompanying drawing, in which:

FIG. 1 is an overall view of a camera shutter which comprises a diaphragm setting control provided with several operating ranges as well as guide lines associated with the diaphragm setting control and a distance setting control; and FIG. 2 is a partial developed view of a camera shutter with a device which releasably connects the diaphragm setting control to a guide number setting control.

Referring to the drawing, reference numeral 1 designates the housing or case of a photographic camera and more particularly the front plate of the camera to which a photographic intra-lens shutter 2 is affixed in the usual manner. A front plate 20 is arranged at the front of the shutter 2. A rotatable lens or distance setting control 21 is positioned ahead of the front plate 20. A progressively graduated non-linear scale 22 is arranged on the front plate 20. The proper distance setting is effected by setting a mark 23′, arranged on the distance setting control 21, opposite the appropriate value of the distance setting scale 22.

In order to establish a simple setting operation when flash exposures are to be effected with the least possible structural expenditure, a guide line scale 27 associated with the distance scale 22 is provided on the front plate 20 to linearize the progressive non-linear characteristic of the distance scale 22.

The intra-lens shutter 2 is also provided with a diaphragm setting control 30. The diaphragm setting control 30 is coupled by means of load transmission components of conventional construction to a mechanism for setting the diaphragm or for a program setting to both the diaphragm and to the exposure time escapement mechanism. Arranged on the diaphragm setting control 30 are, for example, three setting ranges 31, 32 and 33, one of which may be selected by rotating the setting control 30 and placing it opposite a mark 34 fixed on the shutter housing. Because the diaphragm setting control 30 also effects the switching from one operating range to the other, this control may also be termed a switching or reversing member. The range 31, identified by a flash symbol, designates the flash operating range of the camera within which the diaphragm setting is effective in accordance with the preset distance value corresponding to the guide number equation $L=B \times E$ (Guide Number=Diaphragm Value $\times$ Distance Value). Time exposures may be carried out by settings in range 32 symbolized by "B." A scale 35 having the diaphragm values is plotted on the setting control 30 in the "B" range. Thus, different diaphragm values may be set by rotating the setting control 30 after the "B" range has been selected. This range is the selected range shown in the drawing. Range 33, which is identified by a sun symbol, is used to carry out exposures in the daylight range. In this case, the diaphragm alone of the diaphragm and exposure time can be changed by means of the setting control 30 or can be set in response to the light conditions by establishing a proper coupling connection between the setting control and an exposure meter built into the camera.

A guide number setting control 36 is arranged rotatably on the shutter 2 coaxial with the setting control 30. A setting mark 46 is arranged on the setting control 36. The setting control 36 may be operatively connected to the setting control 30, for example, when the camera shutter is set at the operating range 31. This connection is effected by means of a driving lug 38 on the setting control 30 so positioned that it engages a driver 39 mounted on the guide number setting control 36 when the setting control 30 is rotated. When the setting control 30 is switched from the "B" operating range to the operating range 31 designated by the flash symbol, the driving contact between the setting control 30 and the guide number setting control 36, is initiated at the moment at which the left-hand end of the range 31 passes the setting mark 34. Upon further rotation of the setting control 30, the guide number setting control 36 is moved synchronously by way of the two drivers 38 and 39. Conversely, when the setting control 30 is switched from the flash operating range 31 to the "B" operating range 32, the driving connection between the setting control 30 and the guide number setting control 36 is broken at the moment at which the left-hand end of the operating range 31 passes the setting mark 34.

A restoring spring 40, one end of which is connected to the driver 39 and the other end of which is connected to a fixed point 41 on the camera, is provided for maintaining the contact between the drivers 38 and 39 as the setting control 30 is moved within the range 31. A fixed stop 42, against which the driver 39 is pulled by the spring 40, is also provided in the shutter. The position of the stop 42 is so selected that during the movement of the setting control 30, it blocks rotary movement of the guide number setting control 36 caused by the restoring spring 40 after the left-hand end of the range 31 passes the mark 34. In this way, the driving connection between the setting control 30 and the guide number setting control 36 is released so that the setting control 30 has no effect on the guide number setting control 36 when the setting control 30 is set to a value within the operating ranges 32 and 33.

The guide number setting control 36 is provided with a plurality of bores 43, each of which corresponds to a value in a guide number scale 37. The guide number setting control 36 may be connected, by means of a releasable coupling 44, to a transmission member 45 arranged as an annular carrier on which the scale 37 and a setting mark 47 are provided. The guide number of the particular type of flash bulb to be used is set into the shutter by rotating the guide number setting control 36 until the guide number associated with the particular type of flash bulb is positioned opposite the mark 46. When this setting is effected, the coupling 44 is engaged in one of the bores 43 on the guide number setting control 36.

The setting mark 47 is used in conjunction with the guide line scale 27. The guide line scale 27 adapts the progressively graduated non-linear characteristic of the distance scale 22 to a linear setting characteristic designed for setting the diaphragm. A specific distance value of the scale 22 is associated with each guide line. In order to set the proper pairs of diaphragm and distance values according to the required guide number in the flash range or when the operating range 31 is set by means of the setting control 30, the mark 47 is set by rotating the transmission member 45 to the same guide line to which the distance setting scale is set. If, for example, the flash range 31 is selected by the setting control 30, the guide number for the particular type of flash bulb to be used is set into the camera. The setting of the corresponding diaphragm value dependent upon a previously determined distance value and resulting from the guide number equation $L=B \times E$, is effected by moving the setting control 30 to the left until the setting control 30, driving the guide number setting control 36 and the carrier 45 positions the resetting mark 47 opposite the same guide line to which the mark 23' is positioned at the other end of the guide line. In particular, in FIG. 2, the distance setting mark 23' is positioned at a value of "2.5." The setting control 30 is, therefore, moved to the left until it drives the guide number setting control 36 and, therefore, the resetting mark 47 to the same guide line to which the setting mark 23' has been positioned.

A notch catch or ratchet not shown may act upon the setting control 30 and thus offset the action of the return spring 40 on the setting positions of this setting control within the operating range 31.

The releasable connection between the setting control 30 and the guide number setting control 36 shown in FIG. 2, may be utilized in the camera shutter shown in FIG. 1. Alternatively, any comparable arrangement for effecting the desired results may also be used. In order to actuate the releasable coupling between the guide number setting control 36 and the transmission member 45, a detent member 48 is provided which on being pressed inwardly in the direction of the optical axis of the shutter releases the coupling.

It should be pointed out that the invention is not limited to the embodiment illustrated in FIGS. 1 and 2, but may be used wherever an operating range or setting position in addition to the operating range which serves to set the diaphragm at the appropriate setting when flash exposures are to be effected is provided on a diaphragm setting control.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A photographic camera comprising:
   (a) a distance setting control having a fixed mark which acts in conjunction with a fixed, progressively graduated, non-linear distance scale;
   (b) a diaphragm setting control;
   (c) a linear setting scale associated with said diaphragm control;
   (d) a guide line scale associated with said distance scale to correlate the settings of said distance scale to the settings of said linear setting scale;
   (e) and a carrier temporarily coupled to said diaphragm setting control by spring action and having a resetting indicator which acts in conjunction with said guide line scale.

2. A photographic camera comprising:
   (a) a distance setting control having a fixed mark which acts in conjunction with a fixed, progressively graduated, non-linear distance scale;
   (b) a diaphragm setting control;
   (c) a linear setting scale associated with said diaphragm setting control;
   (d) a guide line scale having a plurality of guide lines interconnecting corresponding settings in said distance scale and said linear setting scale to correlate the settings of said distance scale to the settings of said linear setting scale;
   (e) and a carrier unidirectionally temporarily coupled to said diaphragm setting control by spring action and having a resetting indicator which acts in conjunction with said guide line scale and is set to the same guide line as said mark on said distance setting control for pairing the distance and diaphragm values in accordance with the guide number equation when effecting flash exposures.

3. A photographic camera comprising:
   (a) a distance setting control having a fixed mark which acts in conjunction with a fixed, progressively graduated, non-linear distance scale;
   (b) a diaphragm setting control;
   (c) a linear setting scale associated with said diaphragm setting control;
   (d) a guide line scale associated with said distance scale to correlate the settings of said distance scale to the settings of said linear setting scale;
   (e) a guide number setting control tensionally connectible to the housing of said camera and in abutting relationship with said diaphragm setting control for a prescribed range of movement of said diaphragm setting control;
   (f) and a carrier which can be coupled to said guide number setting control in several positions and having a resetting indicator which acts in conjunction with said guide line scale.

4. A photographic camera comprising:
   (a) a distance setting control having a fixed mark which acts in conjunction with a fixed, progressively graduated, non-linear distance scale;
   (b) a diaphragm setting control having a driving lug;
   (c) a linear setting scale associated with said diaphragm setting control;
   (d) a guide line scale associated with said distance scale to correlate the settings of said distance scale to the settings of said linear setting scale;
   (e) a guide number setting control tensionally connectible to the housing of said camera and having a driving lug in abutting relationship with said driving lug on said diaphragm setting control for a prescribed range of movement of said diaphragm setting control;
   (f) a stop member arranged in the path of movement of said guide number setting control for interrupting said abutting relationship between said lugs at a prescribed point in the movement of said guide number setting control for one direction of movement of said guide number setting control;
   (g) and a carrier which can be coupled to said guide number setting control in several positions and having a resetting indicator which acts in conjunction with said guide line scale.

References Cited
UNITED STATES PATENTS

| | | | |
|---|---|---|---|
| 2,829,574 | 4/1958 | Gebele | 95—64 |
| 2,936,690 | 5/1960 | Whitman | 95—64 |
| 2,989,908 | 6/1961 | Bolsey | 95—64 |
| 3,015,998 | 1/1962 | Van der Mei | 95—10 |
| 3,071,056 | 1/1963 | Gebele | 95—64 |

JOHN M. HORAN, *Primary Examiner.*

NORTON ANSHER, *Examiner.*

J. F. PETERS, *Assistant Examiner.*